United States Patent [19]

George

[11] 4,183,823

[45] Jan. 15, 1980

[54] REGENERATION PROCESS FOR POISONED CLAUS ALUMINA CATALYST

[75] Inventor: Zacheria M. George, Edmonton, Canada

[73] Assignee: The Research Council of Alberta, Edmonton, Canada

[21] Appl. No.: 833,242

[22] Filed: Sep. 14, 1977

[51] Int. Cl.$^2$ .................... B01J 21/20; C01B 17/04
[52] U.S. Cl. ................... 252/411 S; 252/416; 252/420; 423/576
[58] Field of Search ............ 252/411 S, 416, 420; 423/576; 55/73

[56] References Cited

U.S. PATENT DOCUMENTS 3,414,524  12/1968  Abson et al. .................... 252/410

FOREIGN PATENT DOCUMENTS 2,304,280  8/1973  Fed. Rep. of Germany ........... 252/416
826657  1/1960  United Kingdom ..................... 252/420

OTHER PUBLICATIONS

"Catalysts For Claus Process", by M. J. Pearson, pp. 12–23, Kaiser Aluminum & Chem. Corp., Oct. 1972.

Primary Examiner—P. E. Konopka
Attorney, Agent, or Firm—Millen & White

[57] ABSTRACT

Poisoned alumina catalyst is removed from the reactor and washed with hot water to remove soluble sulfates. The carbon on the washed catalyst is then burned off and the product may again be washed to remove further sulfates formed during the oxidative burn-off. The activity of the catalyst thus regenerated is comparable to that of fresh alumina catalyst employed for sulfur recovery by the modified Claus process.

2 Claims, 3 Drawing Figures

REGENERATION PROCESS FOR POISONED CLAUS ALUMINA CATALYST

BACKGROUND OF THE INVENTION

This invention relates to a method for regenerating the activity of an alumina catalyst which has been poisoned through use in a modified Claus plant reactor by condensed sulfur, carbon deposits, aluminum sulfate and, possibly, aluminum nitrate, and which has suffered a loss in surface area.

The effective removal of sulfur compounds from sour natural gas is of prime importance in the gas industry. Natural gas, consisting mainly of methane with traces of ethane, propane and higher hydrocarbons, is oftentimes contaminated with hydrogen sulfide gas. The hydrogen sulfide is commonly removed from the natural gas by selective absorption into an amine solution such as ethanolamine, and is subsequently stripped from the solution by a flashing procedure. The gas thus evolved is rich in hydrogen sulfide but still contains some hydrocarbons and carbon dioxide, as well as traces of amine.

The conversion of the toxic hydrogen sulfide to elemental sulfur and water is achieved by the modified Claus process whereby the hydrogen sulfide is first oxidized with a stoichiometric amount of air in a reaction furnace at approximately 1200° C. Elemental sulfur, in an amount of 50–60% of the total sulfur content, is formed with the water, sulfur dioxide, carbonyl sulfide and carbon disulfide. The product stream is cooled to about 150° C. so that the elemental sulfur is condensed and can be removed. The remaining gas, bearing a stoichiometric ratio of $H_2S$ to $SO_2$ of 2:1, is then fed to a series of adiabatic Claus catalytic converters, where the Claus reaction (1) is practiced.

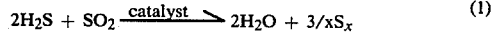

$$2H_2S + SO_2 \xrightarrow{\text{catalyst}} 2H_2O + 3/xS_x \qquad (1)$$

Usually two or three converters, or reactors, are assembled in series, each equipped with a sulfur condensing unit at its outlet. The temperature within each reactor is regulated by the temperature of the ingoing gases which are heated by on-line burners and by the exothermic nature of the reaction. The temperatures of the 1st, 2nd and 3rd converters are commonly set at approximately 330° C., 250° C. and 180° C., respectively.

The high temperature of the first converter effects the oxidation of the carbonyl sulfide and carbon disulfide to elemental sulfur but, otherwise, the equilibrium conversion through the Claus reaction (1) is low. Therefore, the temperature of the subsequent converters are lowered in order to encourage the equilibrium conversion to elemental sulfur.

An alumina-based catalyst is generally employed in each of the converters. The catalyst originally used was bauxite. However, its effectiveness was often reduced by its poor mechanical strength which resulted in unwanted packing and blocking within the converter. The catalyst which has now found widespread use is activated alumina which is 98% by weight $Al_2O_3$. It is available as porous granules, 4–10 mm in diameter, with a surface area of approximately 300 $m^2/gm$.

The activity of the catalyst deteriorates through use due to a deposition of carbon and condensed sulfur, and the formation of aluminum sulfate and, in some cases, aluminum nitrates. The catalyst becomes discolored; its surface area drops 90–140 $m^2/gm$. Table I shows the chemical analysis of both a fresh and a typical poisoned alumina catalyst.

TABLE I

| Component | % Wt. Fresh | % Wt. Poisoned |
|---|---|---|
| $Al_2O_3$ | 93.60 | 59.1 |
| $Fe_2O_3$ | 0.02 | 12.1 |
| $Na_2O$ | 0.30 | 0.5 |
| $SiO_2$ | 0.02 | 1.5 |
| $H_2O$ | 6.0 | 14.6 |
| Total sulfur as $SO_4^=$ | trace | 12.1 |

The catalytic rate of conversion of hydrogen sulfide to sulfur is much decreased in the poisoned catalyst. The catalyst must be regenerated or discarded for a fresh batch. The common method of catalyst regeneration is as follows:

The catalyst in the first and second converters is heated to 400°–500° C. and 300°–350° C., respectively, while a dilute $H_2S/SO_2$ mixture in the ratio of 2:1 is passed over the catalyst for approximately 24–36 hours in order to remove the condensed sulfur.

Carbon, resulting from the cracking and polymerization of hydrocarbons in the reaction furnace and deposited over the catalyst, is stripped through an oxidative burn-off during which the temperature may be increased to 600° C. Air is fed into the converters via the on-line burners so that the oxygen fraction reacts to form carbon dioxide

$$C + O_2 \rightarrow CO_2 \qquad (2)$$

During this burn-off any residual sulfur may react to form aluminum sulfate, which, in turn, must be removed. An $H_2S/SO_2$ mixture, approximately 2:1 in composition, is passed over the catalyst for approximately 14 hours to produce alumina and elemental sulfur, the latter being swept out of the converter by the flowing gases. The converter is cooled down to its operating temperature while maintaining a $H_2S/SO_2$ ratio of 4:1.

The regeneration process described above is a lengthy one, since the catalyst is not transferred out of the converters. These vessels are heavily insulated and, hence, heating or cooling is very slow.

SUMMARY OF THE INVENTION

The object of the present invention is to provide a method for regenerating an alumina catalyst which has been poisoned by deposition of condensed sulfur and carbon, and the formation of aluminum sulfate such as occurs in the Claus converters. The method is both simple and time-saving.

This invention has been practiced on alumina catalysts (98% by weight $Al_2O_3$) that have been rejected for use in Claus converters after a history of regenerations. Samples of poisoned catalysts obtained from different Claus plants in Alberta and regenerated by this process had activities close to that of fresh alumina catalyst, as shown in Table II.

In accordance with the invention, the catalyst is taken out of the catalytic Claus converter and is washed with water to leach out the aluminum sulfate, which is water soluble. The water wash is continued until the sulfate content has been reduced to less than 2.0% by weight. Some soot carbon is also dislodged and removed during this procedure.

The catalyst is then externally heated to a temperature above 300° C. but below the sintering temperature, preferably around 400° C., while simultaneously passing compressed air through the system. Once the carbon has been burnt off, the system is cooled down.

Regeneration is poor if the oxidative burn-off is not preceded by a washing of the catalyst.

At this point, a second wash with water is preferably carried out to decrease the sulfate content further since aluminum sulfate may have formed during the oxidative burn-off of the carbon. Thus a low final total sulfur level may be achieved by using the burn-off to make previously insoluble sulfur available for removal by washing.

Broadly stated, the present invention provides a method for regenerating the activity of an alumina catalyst poisoned through use in a Claus plant reactor, said method comprising leaching aluminum sulfate from the poisoned catalyst by washing it with water until the soluble sulfate content is reduced to less than 2.0% by weight, and heating the washed catalyst to a temperature above 300° C. but below its sintering temperature in a diluted oxygen atmosphere to cause an oxidative removal of carbon deposits.

PREFERRED EMBODIMENT OF THE INVENTION

Figure 1:
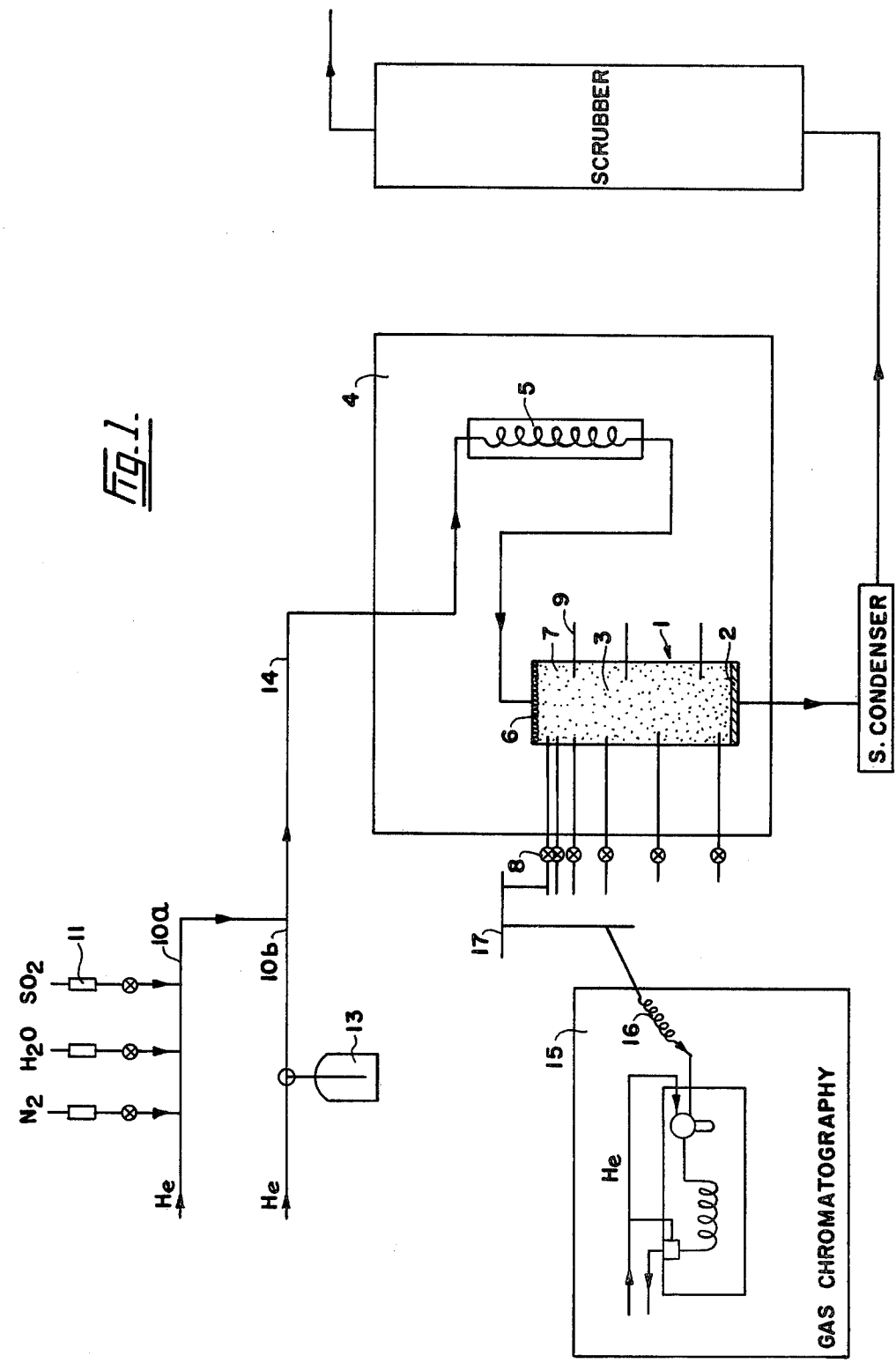
FIG. 1 shows a schematic cross-sectional view of the laboratory equipment used to simulate a Claus converter for purposes of testing the activity of alumina catalysts.

By practise of this process, an alumina catalyst discolored through poisoning with condensed sulfur, carbon deposits, and aluminum sulfate, can be regenerated almost to its initial activity, even when regeneration by conventional means is poor.

The poisoned catalyst is washed with hot water, preferably around 80° C., to leach out the aluminum sulfate the solubility of which increases with temperature. The purpose is to reduce the sulfate content to below 2.0% by weight, preferably below 1.5%. This can be accomplished by several washings or by continuous flow of hot water over the catalyst, preferably with some stirring to facilitate the leaching. Aluminum nitrate, a water-soluble salt, is also removed in this step.

The next step involves externally heating the catalyst to above 300° C. but below its sintering temperature, preferably to 450°-500° C., while simultaneously passing a diluted oxygen gas stream, preferably compressed air, over the catalyst. Below 300° C. the reaction rate of the oxidative burn-off the carbon deposits is slow. Increasing the temperature increases the rate but at high temperatures, in the vicinity of 600° C., sintering of the catalyst occurs. Furthermore, the catalyst may have a history of harsh conditions inside a Claus converter making it preferable to carry out the regeneration below 500° C.

This temperature consideration also requires that the oxygen atmosphere be diluted, since the combustion of carbon is an exothermic reaction. Air, a mixture of 20% oxygen and 80% nitrogen, is a preferred atmosphere. Alternately oxygen may be diluted with another inert carrier gas.

The catalyst is burned until the carbon deposits have been destroyed. This may be checked, if desired, by following the regeneration with such analytical methods as electron paramagnetic resonance, thermal gravimetric analysis, differential thermal analysis, or infrared spectroscopy. Once the carbon removal is complete, the catalyst is cooled down.

It was found that the oxidative burn-off was not efficient if the total sulfur content of the poisoned catalyst had not been lowered beforehand. If subjected to the oxidative burn-off without prior treatment, the catalyst bed developed hot spots. This uneven heat distribution did not give a satisfactory burn-off.

If the sulfur content of the decarbonized catalyst is above desirable levels, the catalyst may be leached a second time in order to further decrease its soluble sulfate content, preferably to 1.5% by weight. Condensed sulfur present on the alumina catalyst prior to the oxidative burn-off is oxidized to sulfate at the same time as the carbon removal is effected. This sulfate can now be removed by a second washing with water.

The regenerated catalyst has essentially lost its former discoloration and displays an activity similar to that of a fresh sample. The surface area of a regenerated catalyst was generally 180-200 m$^2$/g.

The initial sulfur content of poisoned alumina catalyst varies as seen in Table II. This value was determined as sulfate by oxidizing a powered sample of the catalyst with concentrated nitric acid and then precipitating the sulfate as BaSO$_4$ using standard gravimetric procedures. The soluble sulfates on the catalyst were also determined. These consist mainly of aluminum sulfate with some iron sulfates also present.

EXAMPLE 1

This example illustrates one embodiment of the method of the present invention.

A 500-gram sample of a poisoned alumina catalyst of analysis given in line 6 of Table II, was placed in a two-liter beaker. One liter of tap water was added to the catalyst, the combination heated and allowed to stand at 80° C. for 4 hours with occasional stirring. The water was then decanted and a fresh batch of water was added to continue the removal of the soluble sulfates. The initial soluble sulfate content was 3.5% and dropped with each water replacement as shown in Table III. The sulfur content of the catalyst is reduced in this step but not totally eliminated since sulfides, absorbed sulfur dioxide and hydrogen sulfide, and condensed sulfur are present along with the water-soluble sulfates. Once the soluble sulfates in the catalysts have been reduced to 1.5-2.0% the leaching can be stopped.

TABLE III

| Time, hr. | Soluble SO$_4$=, % wt. |
|---|---|
| 0 | 3.5 |
| 4 | 3.3 |
| 8 | 2.2 |
| 12 | 1.9 |
| 16 | 1.5 |

The oxidative burn-off can be carried out at a temperature as low as 350° C., but the optimum temperature range was found to be 450°-500° C.

Using 200 cm$^3$ of the leached catalyst and compressed air at a flow rate of 100 ml/min., the burn-off at 450° C.

was completed in about 4 hours. An analysis of the regenerated catalyst is given in line 7 of Table II; the composition of the poisoned and regenerated catalyst is given in Table IV.

TABLE IV

| Component | % wt. Poisoned | Regenerated |
|---|---|---|
| $Al_2O_3$ | 61.2 | 90.8 |
| $Fe_2O_3$ | 11.5 | 0.04 |
| $Na_2O$ | 0.5 | 0.12 |
| $SiO_2$ | 1.7 | trace |
| $H_2O$ | 15.2 | 7.5 |
| Total S | 10.2 | 0.2 |

The regeneration was considered satisfactory due to the low level of sulfur and the enhanced Claus activity.

The true test of any regenerated Claus catalyst is to compare its activity with a fresh sample under the conditions typical of a third Claus converter; i.e. low partial pressures $H_2S$ and $SO_2$, and high partial pressure of water. The experiment consisted of checking $H_2S$ or $SO_2$ conversions at different depths in a packed catalyst bed. The conditions of the experiment were such that near equilibrium conversions could be obtained in a reasonable bed depth.

The test equipment is shown in FIG. I. It was made out of 316 stainless steel tubing. The reactor 1 was a 2×12 inch tube and contained a 20-mesh stainless steel screen 2 to support the catalyst 3. A sample of catalyst, weighing about 100 grams, and consisting of particles ranging from 2 to 10 mm diameter, was used. A single furnace 4 was used for heating and maintaining the reactor 1 and the preheater 5 at the same temperature.

Immediately above the top of the catalyst bed, a one centimeter length of the bed was packed with stainless steel wire gauze to establish plug flow through the reactor 1. Close to 60% of the $H_2S$ conversion takes place within a narrow catalyst section at the top of the bed 7. Consequently, sampling ports 8 were spaced along the reactor 1 such that a range of conversion could be obtained to enable extrapolation to zero conversion. The reactor 1 was also provided with three thermocouples 9 which indicated that a temperature gradient of 5° C. existed in the catalyst bed when operating at 250° C.

A helium stream 10a was used for transporting the reactants in the reactor 1. The various gases were supplied from cylinders 11 and were bled into the carrier gas by micrometering valves 12. All reactants were over 99 mole % purity. Water was introduced into the system by passing half the helium stream 10b through a water saturator 13 maintained at 80°. The two helium streams 10a and 10b are mixed in a heated line 14 ahead of the reactor 1.

Provision 15 was made by sampling and analysis by gas chromatography of both feed and product streams at will.

Laboratory determinations of the catalytic activity of 110 g. samples were performed at 250°. The inlet composition was maintained at 10 torr $H_2S$, 5 torr $SO_2$, 10 torr $CO_2$, 200 torr $H_2O$ and the balance made up to slightly above atmospheric pressure with $N_2$. The total gas flow rate through the reactor was 3 liters/min.

Once the reactor temperature, partial pressures, and flow rates of the reactants had stabilized, approximately 6 hours after start-up, a heated stainless steel flexible tubing 16 was attached to the sample probe 17. The flow rate through the sample probe was 75 ml/min., about 4 percent of the total flow. Using a six port sample valve, a 2.0 ml sample of feed or product stream including water, could be analyzed by gas chromotography in about 7 minutes. For each sample port located at a different depth along the bed, at least 4 samples were analyzed and the average taken. Repeat analyses of the feed or product samples agreed within 3 percent.

Figure 2:
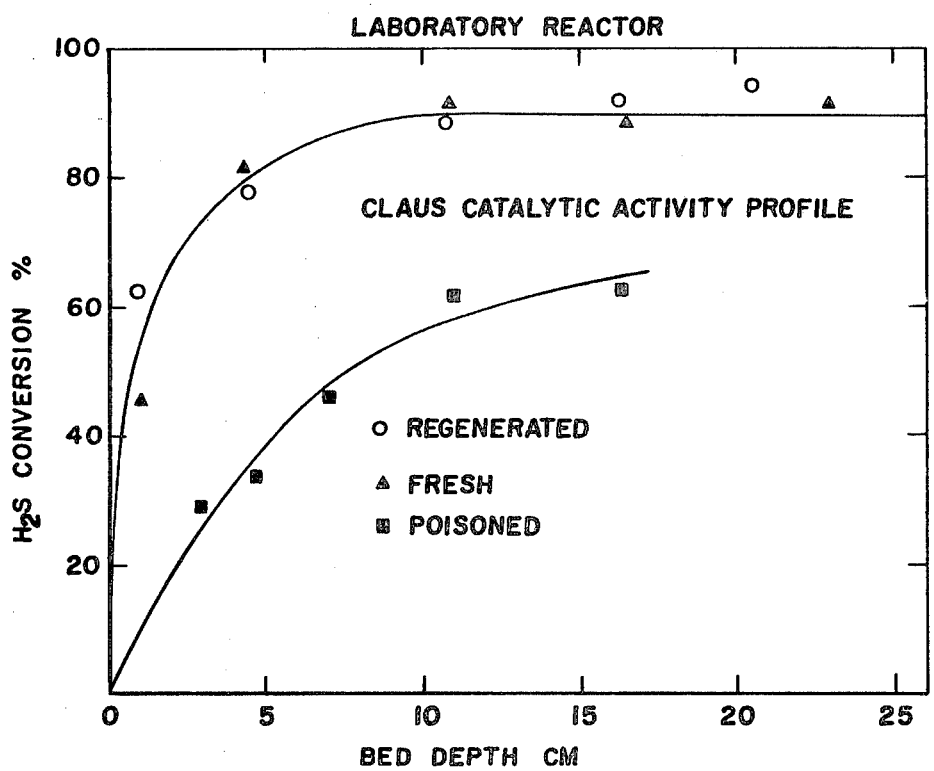
FIG. 2 shows a catalytic activity profile of samples tested with the laboratory reactor.

The rate of Claus reaction can be determined from the consumption of $H_2S$ or $SO_2$, or from water formation. Since the peaks of the gas chromatogram for $SO_2$ and $H_2O$ showed tailings, conversion was obtained from $H_2S$ peak areas. The initial slope of the activity profile seen in FIG. 2 or initial rates of $H_2S$ conversion to sulfur were used for Claus activity comparisons. Five samples of industrial poisoned Claus catalysts regenerated by the process of the present invention had activities similar to that reported in FIG. 2 and Table II.

In addition, EPR spectra of fresh and regenerated catalysts were identical. Poisoned catalysts had an EPR signal of a "g" value between 2.0037 and 2.0059, which is probably due to the carbon deposit. The number of spins/gm was almost identical to the carbon content of the poisoned catalyst. IR spectra of fresh and regenerated catalysts were identical. Poisoned catalysts had a complex IR spectra.

EXAMPLE 2

The first step, being the wash or leaching of the poisoned catalyst, was performed in an alternate method. A 40 g. sample of poisoned catalyst was placed in a container which was then flooded with approximately 1 liter of hot water at about 80° C. The hot water was allowed to continuously bubble from the bottom of the container and to overflow such that 10% of the total fluid volume was constantly being replaced. Overflow was preferred to drainage through an outlet at the bottom of the container as the fines present in the sample tended to block the outlet.

The decrease in the soluble sulfate content of the catalyst with washing as a function of time is shown in Table V.

TABLE V

| Time, hr. | Soluble $SO_4^=$, % wt. |
|---|---|
| 0 | 3.5 |
| 4 | 2.8 |
| 8 | 2.6 |
| 12 | 1.6 |
| 16 | 1.4 |

A comparison with Example 1 indicates that there are no significant differences in the results obtained by the two wash methods.

Once the soluble sulfate in the catalyst has been reduced to 1.5–2.0% by weight, the leaching can be stopped.

EXAMPLE 3

Additional sulfate may be formed by the oxidation of sulfur or other sulfur compound in the catalyst during the oxidative burn-off of the carbon deposits. For the majority of poisoned catalysts regenerated by a leaching followed by a burn-off, the soluble sulfate at the end of the oxidative burn-off was still within the maximum allowed value of 2% by weight. However, in the instances where this level was superceded, a second washing of the catalyst gave a satisfactory regeneration.

A sample of poisoned catalyst, originally 3.8%, by weight, soluble sulfates and 42% total sulfur, was first washed and then burned in the manner shown in Example 1. The analysis of the "regenerated" catalyst indicated 2.5% soluble sulfates and 3.5% sulfur. These levels were considered high and the activity of this catalyst was considerably lower than that of a fresh catalyst.

A 100-gram sample of the above catalyst was placed in a two-liter beaker for additional treatment. The catalyst was leached, burned and leached again in the manner of Example 1. The final sulfate and total sulfur content of the regenerated catalyst was 1.4% and 2.2%, respectively, and the activity of the catalyst was comparable to that of fresh catalyst.

EXAMPLE 4

Testing of the regenerated Claus catalysts were also carried out in a sulfur recovery plant located at Okotoks, Alberta. The pilot plant located within the main plant can be fed with the gas stream going into the first and second Claus catalytic converters as well as tail gas from the second converter.

The reactor was 16×32 inches and could hold about 5 ft.$^3$ of catalyst. The reactor was equipped with ten sampling ports which could be used for either withdrawing gas samples at different heights along the bed or for measuring the temperature profile in the reactor. The inlet gas was brought to the reaction temperature by passing it through electrically heated lines.

The catalyst samples evaluated included fresh, and poisoned alumina Claus catalyst, as well as samples regenerated by the method of this invention. The composition of reactant feed stream which was used for the catalyst evaluation under existing plant conditions is shown in Table VI.

TABLE VI

| Component | Mole % (dry basis) | |
|---|---|---|
| | Feed to No. 1 Reactor | Tail Gas |
| $N_2$ | 76.2 | 85.4 |
| $CO_2$ | 12.4 | 12.3 |
| $H_2S$ | 6.9 | 1.1 |
| $CO_5$ | 0.9 | 0.1 |
| $SO_2$ | 3.5 | 1.0 |
| $CS_2$ | 0.1 | 0.1 |

Figure 3:
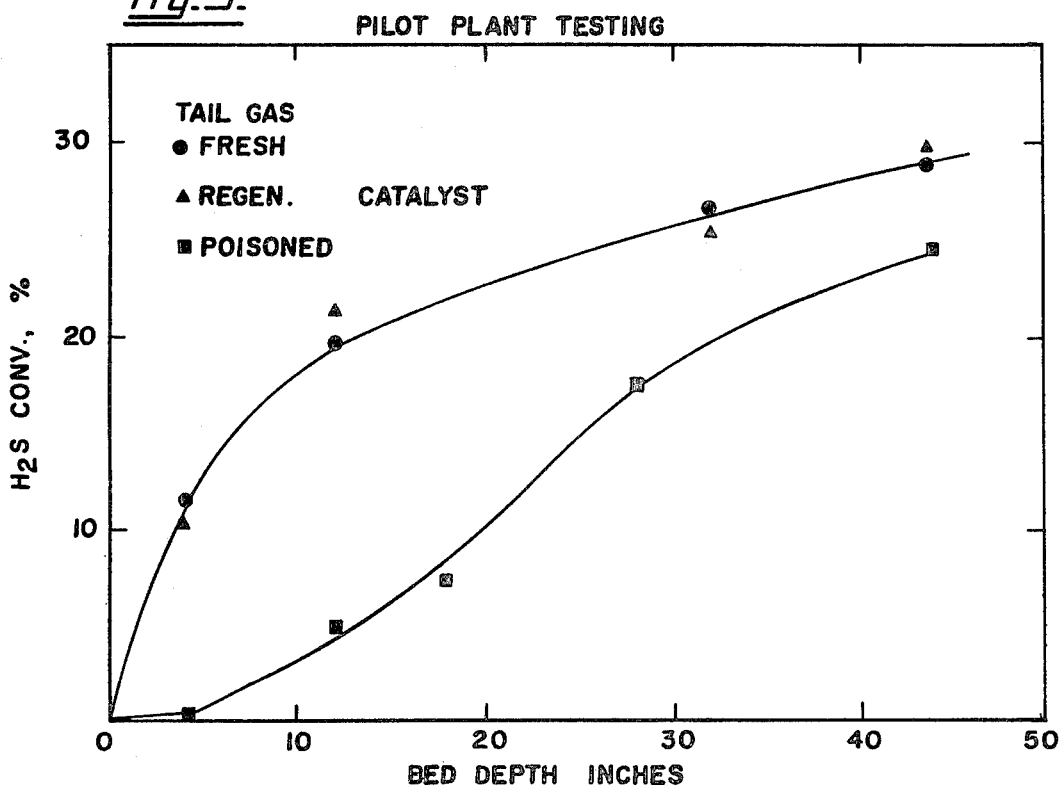
FIG. 3 shows a catalytic activity profile of samples tested in a Claus pilot plant reactor.

At least five days of continuous operation were conducted before samples were withdrawn from different positions along the reactor to construct a catalytic activity profile (conversion versus bed depth). $H_2S$ conversion was determined by analysis by gas chromotography following standard plant procedures. In FIG. 3, the comparison between fresh, poisoned and regenerated alumina catalyst is presented. The initial slope of the activity profile of the catalyst is virtually zero for the poisoned catalyst but is quite high for both the regenerated and the fresh catalyst. The activity profile of the regenerated catalyst closely coincides with that of the fresh catalyst.

TABLE II

CLAUS REACTION CONDITIONS: Temperature 250 ± 3° C., partial pressure of reactants (torr): $H_2S$, 10; $SO_2$, 5; $CO_2$, 10; $H_2O$, 200; and the balance made up to slightly above atmospheric pressure with $He_2$

| Sample | % Wt. | | | | | Surface Area m$^2$/gm | Relative Rate of Claus Reaction |
|---|---|---|---|---|---|---|---|
| | Total Sulfur as $SO_4^=$ | Water-Soluble $SO_4^=$ | Carbon | Hydrogen | $NO_3^-$ | | |
| 1. Fresh | trace | trace | 0.2 | 1.5 | nd.* | 265 | 1.0 |
| 2. Poisoned | 7.0 | 4.9 | 0.5 | 0.9 | 0.08 | 108 | 0.09 |
| 3. Poisoned | 5.2 | 2.2 | 1.5 | 1.5 | 0.02 | 88 | 0.08 |
| 4. Poisoned | 4.0 | 1.6 | 1.8 | 2.0 | 0.11 | 115 | 0.11 |
| 5. Regenerated (4) | 0.2 | trace | nd.* | 1.3 | nd.* | 180–200 | 1.00 |
| 6. Poisoned | 4.1 | 3.5 | 0.8 | 1.1 | 0.22 | 112 | 0.1 |
| 7. Regenerated (6) | 1.1 | 0.68 | — | 1.0 | — | 145 | 0.90 |

*nd. - not determined

The embodiments of the invention in which an exclusive property or privilege is claimed are defined as follows:

1. A method for regenerating the activity of an alumina catalyst poisoned through use in a Claus plant reactor by condensed sulfur, carbon deposits and aluminum sulfate, said method comprising:
   (a) leaching the aluminum sulfate from the poisoned catalyst by washing it with water until the soluble sulfate content is reduced to less than 2.0% by weight; and then
   (b) heating the washed catalyst to a temperature above 300° C. but below its sintering temperature in a diluted oxygen atmosphere to cause an oxidative removal of carbon deposits.

2. The method for regenerating the activity of an alumina catalyst as set forth in claim 1 comprising:
   leaching the aluminum sulfate from the product from step (b) by washing with water to reduce the soluble sulfate content to less than 2.0% by weight.

* * * * *